(12) United States Patent
Pagenkopf

(10) Patent No.: US 11,777,418 B2
(45) Date of Patent: Oct. 3, 2023

(54) ALTERNATING CURRENT (AC) VOLTAGE REGULATOR AND METHOD OF OPERATING THE SAME

(71) Applicant: Hubbell Incorporated, Shelton, CT (US)

(72) Inventor: Kenneth Edward Pagenkopf, Shorewood, WI (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 18/101,941

(22) Filed: Jan. 26, 2023

(65) Prior Publication Data

US 2023/0170817 A1     Jun. 1, 2023

Related U.S. Application Data

(63) Continuation of application No. 17/495,345, filed on Oct. 6, 2021, now Pat. No. 11,569,750, which is a continuation of application No. 16/899,184, filed on Jun. 11, 2020, now Pat. No. 11,152,871.

(60) Provisional application No. 62/862,926, filed on Jun. 18, 2019.

(51) Int. Cl.
| | |
|---|---|
| *G05F 1/40* | (2006.01) |
| *G05F 1/575* | (2006.01) |
| *H02M 3/156* | (2006.01) |
| *H02M 5/293* | (2006.01) |

(Continued)

(52) U.S. Cl.
CPC ............ *H02M 5/293* (2013.01); *H02M 1/44* (2013.01); *H02M 7/04* (2013.01); *G05F 1/40* (2013.01); *G05F 1/575* (2013.01); *H02M 3/156* (2013.01)

(58) Field of Classification Search
CPC .................................. G05F 1/40; G05F 1/575
See application file for complete search history.

(56) References Cited

U.S. PATENT DOCUMENTS 4,302,717 A * 11/1981 Olla ...................... H02M 7/217
                                                          323/324
6,653,824 B1 * 11/2003 Whitlock .................. G05F 1/40
                                                          323/344

(Continued)

OTHER PUBLICATIONS

PCT/US2020/037252 International Search Report and Written Opinion dated Sep. 18, 2020.

(Continued)

*Primary Examiner* — Gary A Nash
(74) *Attorney, Agent, or Firm* — Michael Best & Friedrich LLP

(57) ABSTRACT

An alternating-current (AC) voltage regulator including an isolated power supply, a control circuit, an amplifier, and an output. The isolated power supply is configured to receive an input voltage and output a direct-current (DC) signal isolated from the input voltage. The control circuit is configured to adjust a portion of the input voltage, and output an adjusted voltage. The amplifier is configured to output a differential signal. The differential signal is based on at least one selected from a group consisting of the isolated DC signal, the adjusted voltage, and a feedback loop. The output is configured to add the differential signal to the input voltage resulting in a regulated voltage, and output the regulated voltage.

20 Claims, 2 Drawing Sheets

(51) Int. Cl.
*H02M 1/44* (2007.01)
*H02M 7/04* (2006.01)

(56) References Cited

U.S. PATENT DOCUMENTS

| | | | | |
|---|---|---|---|---|
| 6,933,771 | B2* | 8/2005 | Stearns | G05F 3/205 |
| | | | | 327/540 |
| 7,207,054 | B1* | 4/2007 | Richards | H03F 3/45475 |
| | | | | 323/289 |
| 7,557,551 | B1* | 7/2009 | Somerville | H04B 1/0483 |
| | | | | 455/127.1 |
| 8,922,183 | B2 | 12/2014 | Dearborn et al. | |
| 2008/0224769 | A1* | 9/2008 | Markowski | H03F 3/217 |
| | | | | 330/136 |
| 2012/0077551 | A1* | 3/2012 | Balteanu | H01L 23/528 |
| | | | | 330/199 |
| 2014/0315504 | A1* | 10/2014 | Sakai | H03F 3/189 |
| | | | | 455/127.2 |
| 2015/0155783 | A1* | 6/2015 | Li | H03F 3/2173 |
| | | | | 323/271 |
| 2016/0261194 | A1* | 9/2016 | Lam | H02M 3/156 |

OTHER PUBLICATIONS

U.S. Appl. No. 17/495,345, filed Oct. 6, 2021, now U.S. Pat. No. 11,569,750.

* cited by examiner

ALTERNATING CURRENT (AC) VOLTAGE REGULATOR AND METHOD OF OPERATING THE SAME

RELATED APPLICATIONS

This application claims priority to U.S. patent application Ser. No. 17/495,345, filed Oct. 6, 2021, which claims priority to U.S. patent application Ser. No. 16/899,184, filed Jun. 11, 2020, which claims priority to U.S. Provisional Patent Application No. 62/862,926, filed Jun. 18, 2019, the entire contents of both of which are hereby incorporated by reference.

FIELD

Embodiments relate to alternating-current (AC) voltage regulators.

SUMMARY

AC voltage regulators may use magnetic, mechanical, variants of ferro-resonance, servo-variac, tap changing, and/or electrical switching to perform AC voltage regulation. Such systems operate by regulating approximately 100% of the power received with approximately 90% efficiency. For example, regulation of 500 watts using such systems may require conversion of all 500 watts to regulate voltage. As a result, such systems and methods may not only be overly large, but also expensive to manufacture and expensive to operate.

Thus one embodiment provides an alternating-current (AC) voltage regulator including an input, an isolated power supply, a control circuit, an amplifier, and an output. The input is configured to receive an input voltage. The isolated power supply is configured to receive the input voltage and output a direct-current (DC) signal isolated from the input voltage. The control circuit is configured to receive a portion of the input voltage, adjust the portion of the input voltage, and output the adjusted voltage. The amplifier is configured to receive the isolated DC signal, the adjusted voltage, and a feedback loop, and output a differential signal. The output is configured to add the differential signal to the input voltage resulting in a regulated voltage, and output the regulated voltage.

Another embodiment provides a method of regulating an alternating-current (AC) voltage. The method includes receiving, via an input, an input voltage, and outputting, via an isolated power supply, a direct-current (DC) signal isolated from the input voltage. The method further includes receiving, via a control circuit, a portion of the input voltage, adjusting, via the control circuit, the portion of the input voltage, and outputting the adjusted voltage. The method further includes receiving, via an amplifier, the isolated DC signal, receiving, via a the amplifier, the adjusted voltage, receiving a feedback loop from an amplifier output to a second input of the amplifier, and outputting, via the amplifier, a differential signal. The method further includes adding the differential signal to the input voltage resulting in a regulated voltage, and outputting, via the output, the regulated voltage.

Such embodiments may maximize efficiency and lower costs by providing proper regulation without the need to regulate entire line voltage. In one embodiment of operation only 10% of the power may actually be converted. Thus, for example, only 50 watts (of a total of 500 watts) may be converted to regulate the voltage, while the remaining 450 watts is allowed to pass by on the line.

Furthermore, such embodiments do not need to regulate when regulation is unnecessary. Whereas systems that incorporate magnetic, mechanical, variants of ferro-resonance, servo-variac, tap changing, and/or electrical switching to perform regulation often times must still convert 100% of the power received regardless if regulation is actually necessary.

As a result of only requiring to convert approximately 10% of the total power, and only regulating when necessary, the above described embodiment may be approximately $1/50^{th}$ the size and weight of AC voltage regulators using magnetic, mechanical, variants of ferro-resonance, servo-variac, tap changing, and/or electrical switching to perform regulation. Furthermore, the above described embodiment may be approximately $1/10^{th}$ the cost of AC voltage regulators using magnetic, mechanical, variants of ferro-resonance, servo-variac, tap changing, and/or electrical switching to perform regulation. Additionally, such efficiencies may lead to reduced costs of operation compared to systems that incorporate magnetic, mechanical, variants of ferro-resonance, servo-variac, tap changing, and/or electrical switching to perform regulation.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
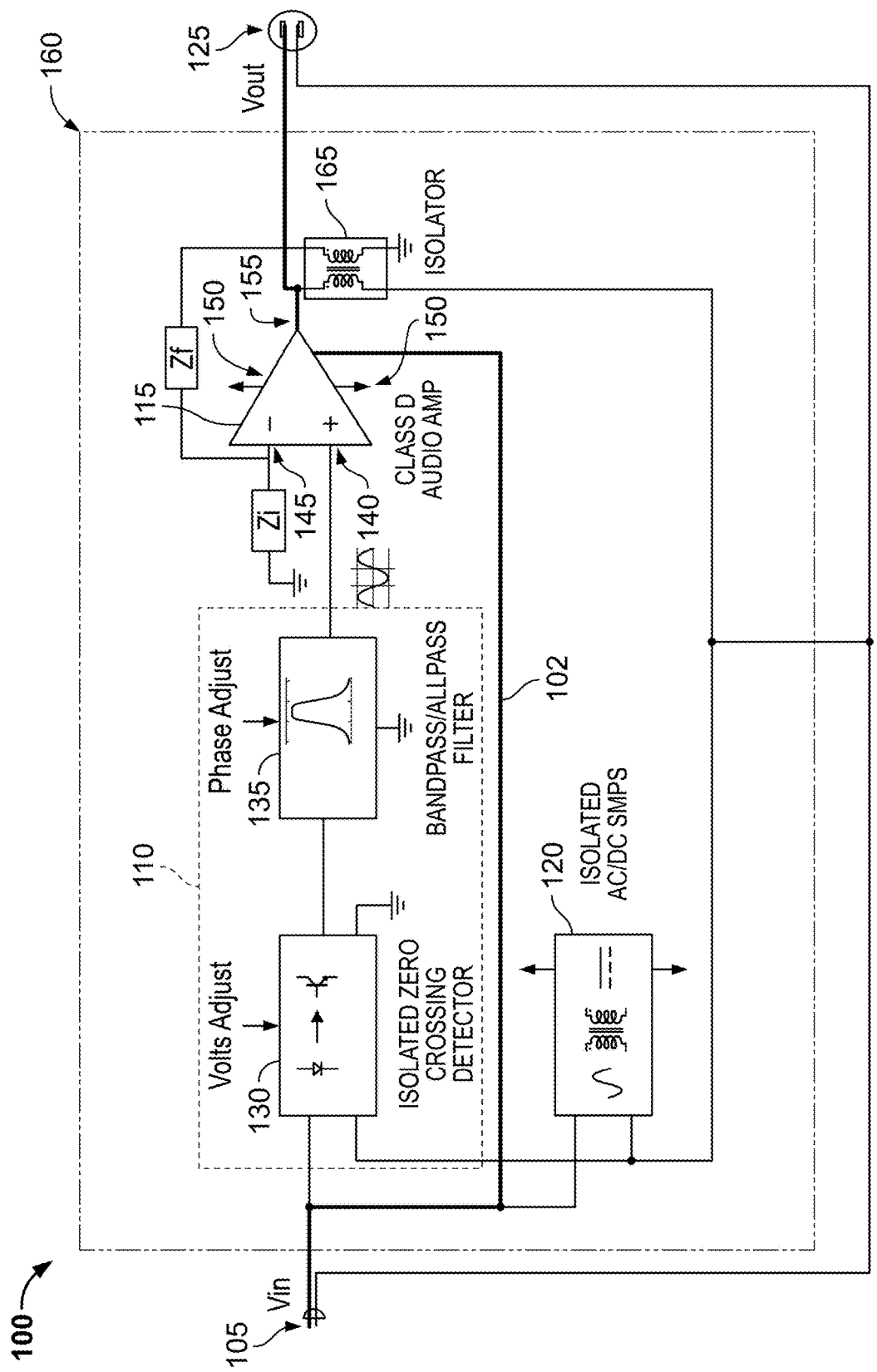
FIG. 1 is a block diagram of an alternating current (AC) regulator according to some embodiments.

FIG. 1 is a block diagram of a regulator 100 according to some embodiments. In some embodiments, the regulator 100 may be a voltage regulator, such as but not limited to, an alternating current (AC) series pass voltage regulator configured to regulate a voltage on a line 102.

In operation, the regulator 100 may be configured to receive a portion of an input voltage from line 102 and add a differential voltage signal back onto line 102, resulting in a regulated voltage (for example, a voltage having a predetermined amplitude and frequency). In some embodiments, partial power regulation is used to achieve the regulated voltage by adding the differential voltage signal to the input voltage.

The regulator 100 may regulate line voltage by converting only a portion of the total power of the line voltage. For example, the regulator 100 may only convert approximately 10% of the total power (e.g., 50 watts of a total of 500 watts), while the remaining 90% of the total power (e.g., 450 watts) is allowed to pass by (for example, via line 102). As a result, a regulator 100 having 70% efficiency (i.e., a 30% loss), is 70% efficient on only approximately 10% of the total power. Therefore, the regulator 100 may regulate the line voltage with a total efficiency of 97% (i.e., a 3% total loss).

Furthermore, the regulator 100 may only regulate line voltage when needed. For example, when the input line voltage already has the predetermined amplitude and frequency, the regulator outputs a differential voltage signal having approximately zero volts. In such an embodiment, the regulator 100 is using idle or rest current and not conversion power. Such operation leads to even greater efficiencies.

In the illustrated embodiment, the regulator 100 includes an input 105, a control circuit 110, an amplifier 115, a pulse-width modulated (PWM) power supply 120, and an output 125. The input 105 is configured to receive an input voltage from line 102. In some embodiments, the input voltage is within a range of approximately 95 VAC to approximately 135 VAC. The input voltage may be split-phase AC or three-phase AC.

The control circuit 110 is configured to receive at least a portion of the input voltage, adjust the input voltage, and output the adjusted voltage. In some embodiments, the control circuit 110 may receive approximately 10% of the power of the input voltage (for example, 50 watts of a total of 500 watts), while the remaining 90% of the power (for example, 450 watts) passes by via line 102. In some embodiments, the control circuit 110 adjusts the amplitude and/or phase of the portion of the input voltage.

In some embodiments, the control circuit 110 includes a zero crossing detector 130 and a filter 135. In such an embodiment, the portion of the input voltage may be received by the zero crossing detector 130 from the input 105. The zero crossing detector 130 may be configured to convert the portion of the input voltage from a sine wave to a square wave having a regulated amplitude. In some embodiments, the zero crossing detector 130 includes one or more opto-couplers. In other embodiments, the zero crossing detector 130 includes one or more transformers. In some embodiments, the zero crossing detector 130 is rail-to-rail immune to input voltage variations, harmonics, and noise.

The square wave having the regulated amplitude may then be received by the filter 135. The filter 135 may receive the square wave having the regulated amplitude, adjust the phase of the received square wave, and output the adjust wave as a filtered sine wave having adjusted amplitude and phase.

In some embodiments, the filter 135 is, or includes, a bandpass filter and/or an all-pass filter. In such an embodiment, the bandpass filter may include a Chebyshev $4^{th}$ order filter followed by a $1^{st}$ order Butterworth filter. Such a bandpass filter may induce an unwanted phase shift that may be removed by the all-pass filter.

In other embodiments, the control circuit 110 is a digital signal processor (DSP). In such an embodiment, the DSP is configured to receive the portion of the input voltage and output a sine wave having adjusted amplitude and phase.

The amplifier 115 is configured to receive the adjusted voltage and output a differential voltage signal. In some embodiments, the amplifier 115 is a class D audio amplifier. In other embodiments, the amplifier 115 is a class T audio amplifier. In some embodiments, the amplifier 115 has a bandwidth of approximately 20 kHz. In such an embodiment, the amplifier 115 may correct harmonics and distortions occurring up to approximately 20 kHz, thereby functioning as an active voltage harmonic and/or hash filter.

The amplifier 115 may include a first input 140, a second input 145, power inputs 150, and an output 155. In the illustrated embodiments, the first input 140 is a non-inverting input and the second input 145 is an inverting input.

In one embodiment of operation, the amplifier 115 receives the adjusted voltage at input 140 and outputs, via output 155, the differential voltage signal. In some embodiments, the amplifier 115 is an inverting amplifier, including for example, an inverting control loop 160. The inverting control loop 160 may be a feedback loop electrically connecting the output 155 to the second input 145. In some embodiments, the control loop 160 may include a digital signal processor (DSP) configured to providing inverting feedback to the amplifier 115.

In the illustrated embodiment, the output 155 and the control loop 160 are electrically isolated from each other via isolator 165. In some embodiments, the isolator 165 includes one or more opto-isolators. In other embodiments, the isolator 165 is a transformer.

The pulse-width modulated (PWM) power supply 120 is configured to convert the input voltage to a direct-current (DC) voltage. In some embodiments, the PWM power supply 120 is an isolated power supply. In such an embodiment, the PWM power supply 120 may be an isolated AC/DC switched mode power supply.

The PWM power supply 120 may provide isolated DC voltage to the power inputs 150 of the amplifier 115. Thus, the amplifier 115 may be electrically isolated from the input voltage at both the power inputs 150 and the second input 145 (via feedback loop 160).

In operation, the regulator 100 receives the input voltage (for example, a line voltage) at input 105. A portion (for example, approximately 10% of the total power) of the input voltage is received by the control circuit 110, while the remaining (for example, approximately 90% of the total power) of the input voltage passes by the regulator 100 via line 102.

The control circuit 110 receives a portion of the input voltage, adjusts the amplitude and phase of the voltage, and outputs the adjusted voltage to the amplifier 115. The amplifier 115, based on at least the adjusted voltage received at input 140 and the isolated feedback loop received at input 145, outputs a differential voltage signal. The amplifier 115 may be powered via isolated DC voltage from the PWM power supply 120. The differential voltage signal is then added to the by-passed input voltage resulting in a regulated voltage on line 102.

In some embodiments, the regulator 100 may further include protection circuitry. The protection circuitry may provide additional protection to the regulator 100 including, but not limited to, protection from shorting issues. In some embodiments, the protection circuitry may include, but is not limited to, a mechanical relay, a solid-state relay, and/or a dual MOSFET.

Figure 2:
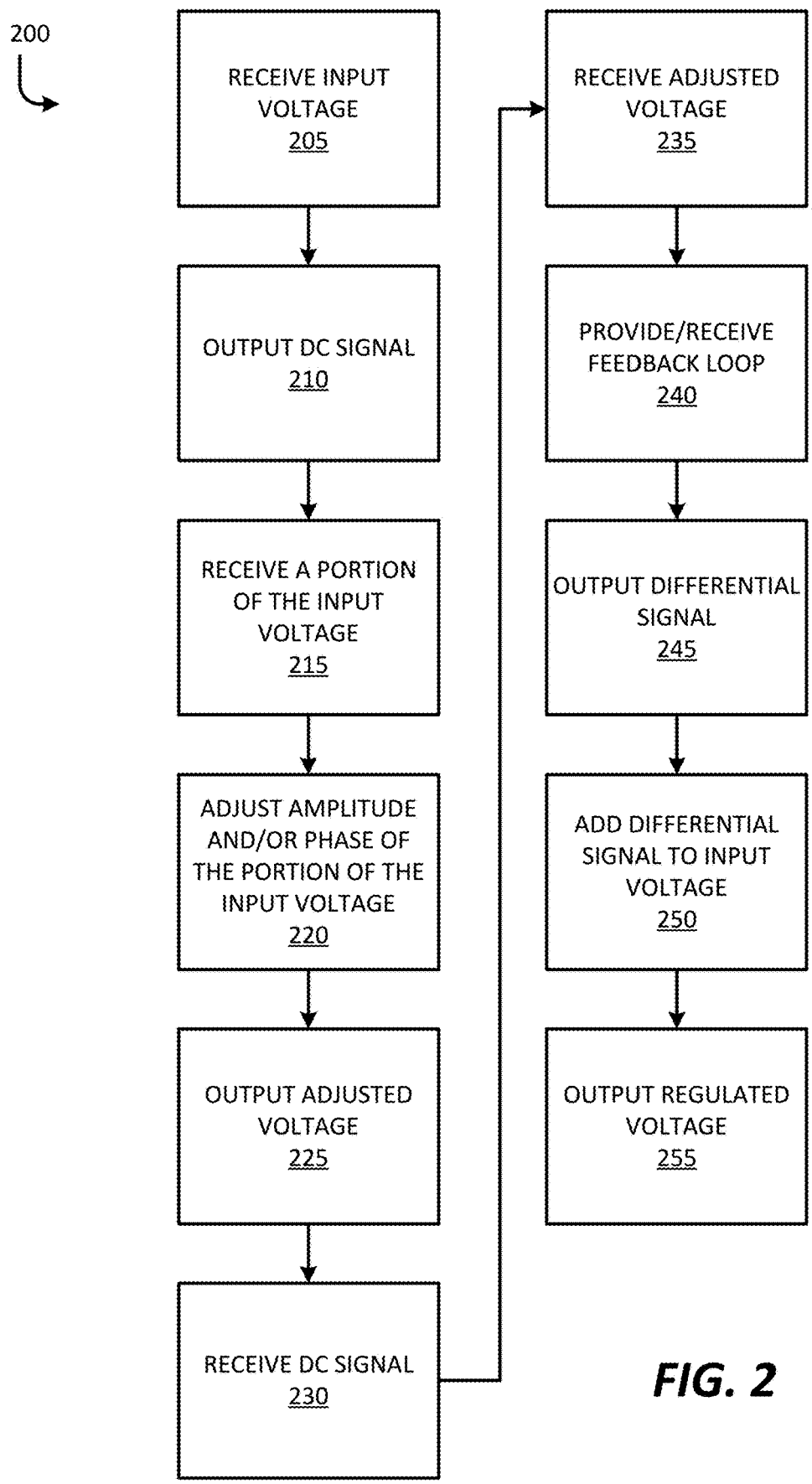
FIG. 2 is a flowchart illustrating an operation of the AC regulator of FIG. 1 according to some embodiments.

FIG. 2 is a flowchart illustrating an operation 200 of the regulator 100 according to some embodiments. It should be understood that the order of the steps disclosed in operation 200 could vary. Although illustrated as occurring in serial order, in other embodiments, the steps disclosed may be performed in parallel order. Furthermore, additional steps may be added to the process and not all of the steps may be required At block 205, an input voltage (for example an AC voltage) is received at input 105. A direct-current (DC) signal is output from the AC/DC PWM power supply 120 (block 210). In some embodiments, the DC signal is isolated from the input voltage (for example, via the AC/DC PWM power supply 120).

A portion of the input voltage is received by the control circuit 110 (block 215). An amplitude and a phase of the portion of the input voltage is adjusted via the control circuit 110 (block 220). The control circuit 110 outputs the adjusted voltage (block 225).

The DC signal is received via power input 150 of the amplifier 115 (block 230). The adjusted voltage is received via input 140 of the amplifier 115 (block 235). A feedback loop from amplifier output 155 is received by input 145 of the amplifier 115 (block 240). A differential signal is output via amplifier output 155 (block 245). The differential signal is added to the input voltage, resulting in a regulated voltage (block 250), and the regulated voltage is then output (for example, via output 125) (block 255).

Embodiments provide, among other things, an alternating current (AC) voltage regulator. Various features and advantages of the application are set forth in the following claims.

What is claimed is:

1. An alternating-current (AC) voltage regulator comprising:
    an isolated power supply configured to receive an input voltage and output a direct-current (DC) signal isolated from the input voltage;
    a control circuit configured to adjust a portion of the input voltage, and output an adjusted voltage;
    an amplifier configured to output a differential signal, the differential signal based on at least one selected from a group consisting of the isolated DC signal, the adjusted voltage, and a feedback loop; and
    an output configured to add the differential signal to the input voltage resulting in a regulated voltage, and output the regulated voltage.

2. The AC voltage regulator of claim 1, wherein an output of the amplifier is electrically isolated from an input of the amplifier via an isolator.

3. The AC voltage regulator of claim 2, wherein the isolator includes at least one selected from a group consisting of one or more opto-isolators and a transformer.

4. The AC voltage regulator of claim 1, wherein the isolated power supply is an AC/DC pulse-width modulated (PWM) power supply.

5. The AC voltage regulator of claim 1, wherein control circuit adjusts at least one selected from a group consisting of an amplitude of the portion of the input voltage and a phase of the portion of the input voltage.

6. The AC voltage regulator of claim 1, wherein the control circuit is a digital signal processor (DSP).

7. The AC voltage regulator of claim 1, wherein the control circuit includes a zero crossing detector.

8. The AC voltage regulator of claim 7, wherein the zero crossing detector is configured to
    receive the input voltage,
    detect a zero cross of the input voltage, and
    adjust the input voltage based on the zero cross.

9. The AC voltage regulator of claim 7, wherein the zero crossing detector includes one or more opto-isolators.

10. The AC voltage regulator of claim 7, wherein the zero crossing detector includes one or more transformers.

11. The AC voltage regulator of claim 1, wherein the control circuit includes a filter.

12. The AC voltage regulator of claim 11, wherein the filter is a bandpass filter.

13. The AC voltage regulator of claim 11, wherein the filter includes a digital signal processor (DSP).

14. The AC voltage regulator of claim 1, wherein the amplifier is at least one selected from a group consisting of a class D audio amplifier and a class T audio amplifier.

15. The AC voltage regulator of claim 1, wherein the input voltage is at least one selected from a group consisting of a split-phase voltage and a three-phase voltage.

16. The AC voltage regulator of claim 1, wherein the regulated voltage has a frequency of at least one selected from a group consisting of 50 Hz, 60 Hz, and 400 Hz.

17. The AC voltage regulator of claim 1, wherein the feedback loop includes a digital signal processor (DSP).

18. A method of regulating an alternating-current (AC) voltage, the method comprising:
    receiving, via an isolated power supply, an input voltage;
    outputting, via the isolated power supply, a direct-current (DC) signal isolated from the input voltage;
    adjusting, via the control circuit, at least a portion of the input voltage;
    outputting, via the amplifier, a differential signal, wherein the differential signal is based on at least one selected from a group consisting of the isolated DC signal, the adjusted voltage, and a feedback loop; and
    adding the differential signal to the input voltage resulting in a regulated voltage; and
    outputting, via the output, the regulated voltage.

19. The method of claim 18, further comprising:
    receiving, via a zero crossing detector, the input voltage,
    detecting, via the zero crossing detector, a zero cross of the input voltage, and
    adjusting, via the zero crossing detector, the input voltage based on the zero cross.

20. The method of claim 18, wherein the control circuit includes at least one selected from a group consisting of a zero crossing detector and a digital signal processor (DSP).

* * * * *